United States Patent [19]
Wendt et al.

[11] 3,807,474
[45] Apr. 30, 1974

[54] MOLDED WHEELS

[76] Inventors: David W. Wendt, 2833 Milton Ave., Janesville, Wis. 53545; Ronald E. Ehlers, Rt. 2, Fort Atkinson, Wis. 53538

[22] Filed: July 26, 1972

[21] Appl. No.: 275,416

[52] U.S. Cl. .............................. 152/324, 301/111
[51] Int. Cl. .............................................. B60c 7/24
[58] Field of Search .......... 152/324, 326, 329, 316; 301/111, 108, 98

[56] References Cited
UNITED STATES PATENTS
2,978,277   4/1961   Gaudry ............................. 152/324
2,717,807   9/1955   Kapp ................................. 301/111

*Primary Examiner*—James B. Marbert
*Attorney, Agent, or Firm*—Theodore J. Long; John M. Winter

[57] ABSTRACT

A wheel assembly having a molded hub with either semi-pneumatic, semi-solid or solid tires mounted on the hub. The wheel has a web extending outwardly from its axle portion to a substantially transverse flange which extends about the periphery of the web. A locking rim extends radially outward from the flange and has slots extending through it and circumferentially spaced about the rim. Inserts are attached to or integrally molded with the locking rim to provide a tire core of less dense and less expensive material. A tire is applied to the locking rim and insert and the tire material is continuous through the slots in the locking rim.

5 Claims, 8 Drawing Figures

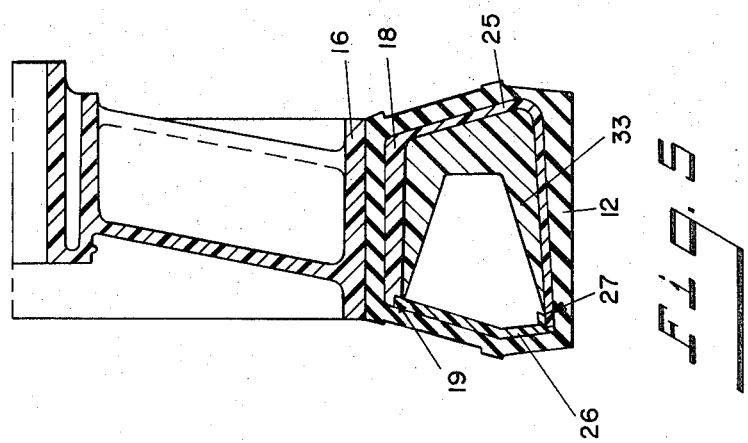
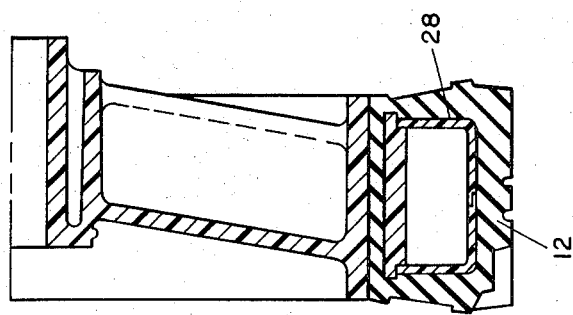

MOLDED WHEELS

BACKGROUND OF THE INVENTION

1. Field of the Invention

This invention pertains to wheels having a hub of special design and having a solid, semi-solid or semi-pneumatic tire applied to said hub.

2. Description of the Prior Art

Various types of cushion tire structures have been invented in the past. For instance, U.S. Pat. No. 1,461,531 by F. R. Klaus, et al., shows a sectioned wheel having a diameter slightly less than the diameter of the tire to be fitted thereon. After the tire is placed on the ring the sectioned wheel is expanded to create a sufficiently tight engagement between the tire and the wheel to prevent relative circumferential movement. However, if this type of tire was subjected to lateral force, the tire can become dislodged from the wheel. The tire is not locked radially and axially onto the wheel.

Another tire is shown in U.S. Pat. No. 1,702,386 by H. W. Kranz. Kranz' tire has a ring or rim of slightly greater diameter than the tire to be fitted on it, but the rim is crimped internally so as to be initially of smaller diameter. After the tire is placed on the rim the crimped portions are pressed back to their normal position so as to expand the ring to a diameter greater than that of the tire, again forming a substantially tight engagement between the tire and the ring so as to prevent circumferential relative movement. Likewise, however, this type wheel does not provide a means to radially and axially lock the tire onto the wheel or rim to prevent the tire from being dislodged when subjected to a pulling or a sideward force. The most desirable wheel is one in which the tire is radially, circumferentially, and axially locked onto its wheel, but neither of the above two patents nor other similar ones provide all these features.

The above cited patents and prior art pertain to wheels of large diameter which were apparently used in the olden days for horse drawn vehicles. These previously patented inventions would be impractical, if not impossible, on wheels of less than about 20 inches in diameter. They also pertain to wheels using tires primarily of a solid cross-section.

SUMMARY OF THE INVENTION

Generally, our invention comprises a wheel assembly that has a substantially rigid hub of unique design with a resilient tire applied to said wheel.

An object of our invention is to provide a locking means on the outer periphery of the hub. Another object of our invention is to provide a wheel structure wherein the tire is positively locked radially, circumferentially and axially to the hub.

A still further object is to provide a wheel structure wherein tires of varying size and construction can be applied and positively locked to the same size hub by use of tire core inserts which may be applied to the hub, and which wheel structure can be used with solid, semi-solid or semi-pneumatic tires of large or small diameters.

These and other objects of our invention, which will be apparent from the description and drawings, are accomplished by our wheel assembly which has a substantially rigid hub having a locking rim at its periphery. The locking rim has circumferentially spaced elongate slots extending through it. A resilient tire is applied to said locking rim and the tire material extends continuous through the elongate slots. The tire is thereby locked onto said wheel so that it cannot be dislodged outwardly or radially, such as by a pulling force, or axially such as by a sideward force, nor can there be any circumferential relative movement between the tire and the hub. The use of various tire core inserts snapped on the locking rim allow use of the same size hub for various size and diameter tires.

BRIEF DESCRIPTION OF THE DRAWINGS

FIGS. 5 and 6 are partial cut away views showing other embodiments of our invention.

DESCRIPTION OF THE PREFERRED EMBODIMENT

Figure 1:
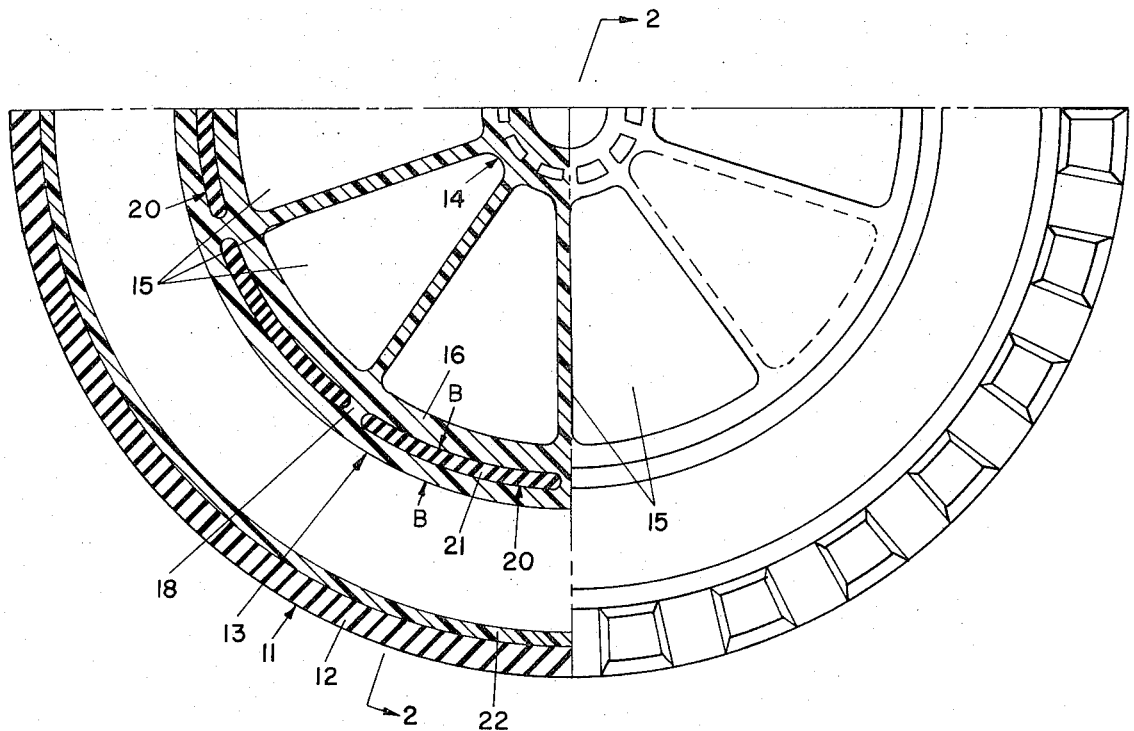
FIG. 1 is a partial side view with a portion of the wheel and tire shown by a radial section.

Referring now more particularly to the drawings a wheel assembly 11 having a tire 12 molded onto a substantially rigid hub 13 is shown. Hub 13 has an axle portion 14 with a web 15 extending radially outwardly from the axle portion 14. Web 15 is preferably a solid web with raised ribs, such as are shown in the drawings, and is of another structurally strong configuration. However the web could consist of radial spokes instead as well as any of the other well known wheel structures.

A circumferential transverse flange 16 extends about the periphery of the web 15 and provides a surface upon which the tire 12 is seated as shown at 17. A locking rim 18 extends radially outwardly from and about the periphery of the flange 16. The locking rim 18 is preferably notched at each side, as shown at 19, so that tire inserts, to be explained later, can be snapped onto the locking rim. The locking rim 18 has circumferentially spaced elongate slots 20 extending through it so that the tire material which is molded onto the wheel is continuous through these slots for locking the tire onto the wheel. The locking rim is preferably wider in its axial direction than its circumferential depth as shown by A—A and B—B respectively in FIG. 2. This dimension ratio is needed when it is desired to use wide base tires on small diameter wheels.

In our preferred embodiment the hub structure is preferably made of a high density, linear polyethylene material, but it is recognized that the wheel can be made of any substantially rigid material which is suitable for molding resilient tires thereto.

Figure 2:
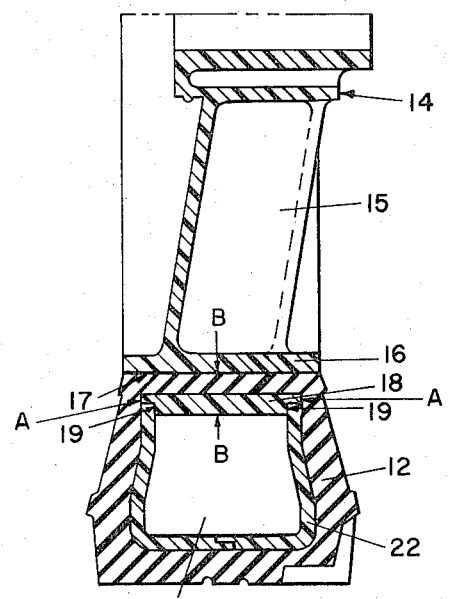
FIG. 2 is a partial cut away view showing our wheel as seen through section lines 2—2 in FIG. 1.

A tire 12 is molded on the locking rim 18 and extends outwardly therefrom. The tire seats against the transverse flange as shown at 17 and is continuous through the elongate slots 20 in the locking rim 18 as shown at 21. Tire 12 can be a solid tire (not shown in the drawings) molded to the hub 13. However, in our preferred embodiments, the tire we form is of the semi-pneumatic type. A generally U-shaped tire insert 22 fits onto the locking rim 18. This is the reason for the notches 19 in the locking rim that were mentioned earlier. By referring to FIG. 2 it is more readily apparent how this tire insert is applied to the locking rim 18. This tire insert then forms a core about which the tire 12 is molded. The tire insert shown in the FIG. 2 is formed of a substantially rigid material and provides a hollow core 23. The tire insert extends about the periphery of the locking rim and may be a single piece insert or several elongate inserts spaced about the periphery of said rim.

The tire 12 can be manufactured from any suitable resilient material such as rubber, polyvinyl, and any of the other well known synthetic materials used in the manufacture of tires. In some instances, the tire may preferably be made from a hard material. Likewise a solid tire can be used without tire core inserts. Another tire that can be used with our hub without tire core inserts is one made of a semi-solid material that is a homogeneous material with variable density, known by those skilled in the art as integral skin foams.

Figure 3:
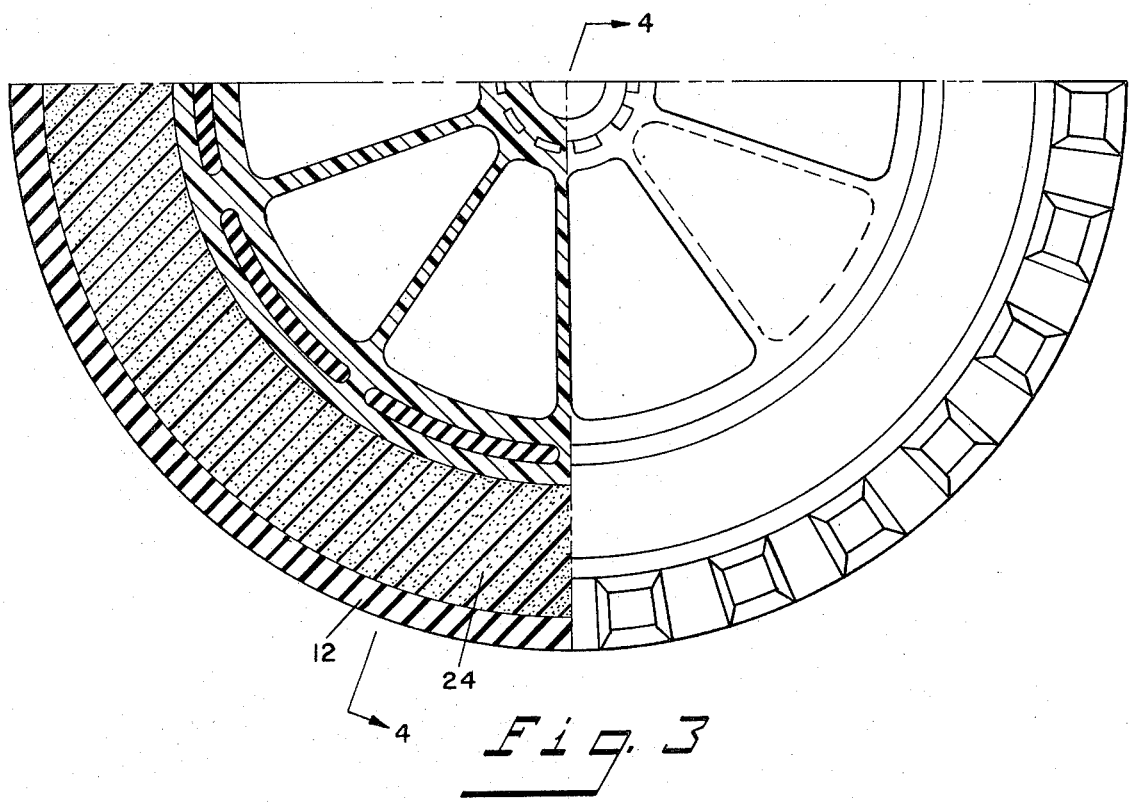
FIG. 3 is a partial side view showing an embodiment of our wheel having a solid core tire insert attached to the wheel before the tire is applied thereto.
Figure 4:
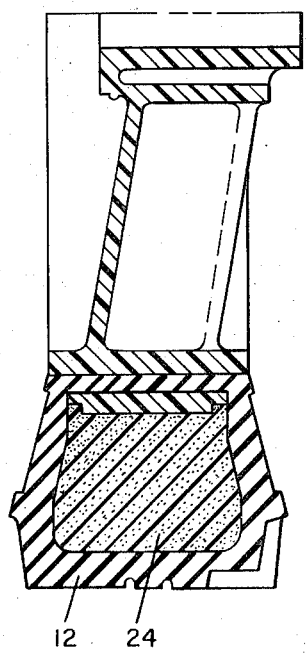
FIG. 4 is a partial cut away view showing our wheel as seen through section lines 4—4 in FIG. 3.

In another embodiment of our invention shown in FIGS. 3 and 4 the tire insert 24 is made of solid material, such as a polystyrene foam, and forms a solid core for the tire 12. The insert 24 snaps onto or is applied to the locking rim 18 in the same manner as the hollow cored tire insert 22.

Still another embodiment of our invention is shown in FIG. 5. In this embodiment, a partial tire core 25 is integral to the locking rim 18. The partial tire core 25 extends outwardly from the locking rim 18 as shown in FIG. 5. A tire core insert 26 snap fits onto the partial tire core at 27 and onto the locking rim 18 at 19. When the tire core insert 26 has been snapped into place as thus described, a tire core has been formed as is readily apparent from FIG. 5. The tire 12 is then molded on the locking rim 18. In this embodiment the tire 12 extends around the tire core and seats against the transverse flange in the same manner as prescribed in the previous embodiments. Optional radial spokes 33 can be made an integral part of the locking rim and tire core insert 26 to provide structural support for the tire core insert. Although not shown in the drawings of the other tire core inserts, similar spokes may be used when additional strength is required for any of my tire core inserts.

Figure 8:
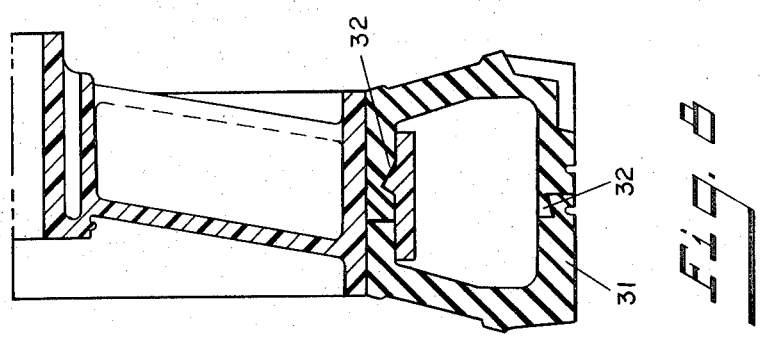
FIGS. 7 and 8 are partial cut away views showing other embodiments of own invention.
Figure 7:
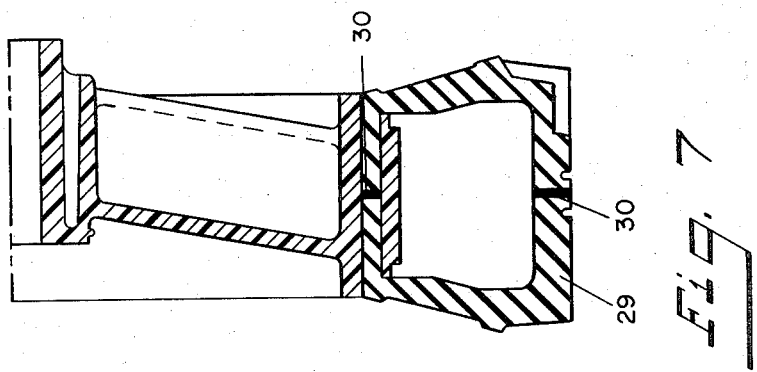

Yet another embodiment is shown in FIG. 7 and an alternate variation in FIG. 8. Pre-molded circumferentially divided sections 29 are mounted on the locking rim 18 and are bonded together at 30 after mounting. An alternative construction in FIG. 8 shows pre-molded tire sections 31 mounted on the locking rim and secured to each other by their integral locking lugs 32.

It has been found that the use of tire inserts such as those shown at 22 and 24 and 25, 26 to form a core for the tire has significant advantages over molding a solid tire onto the wheel 13. It is not necessary to use as much material as it would be if solid tires were used and further by reducing the mass of an otherwise solid, and slower curing material, the molding time can be reduced which is a significant economic factor.

Further the use of different size and shape tire inserts 28 such as is shown in FIG. 6 enables the manufacturer of wheel assemblies of varying size and diameter while using the same size rigid wheel. In each instance the size, shape and material used for the tire inserts is governed by the final wheel assembly size desired, the type of tire material used and the final tire shape which is desired.

It is understood that this invention is not confined to the particular construction, arrangement of parts, and materials herein illustrated and described for exemplification of the principles of the invention, but embraces all such modified forms thereof as come within the scope of the following claims.

We claim:
1. A wheel assembly comprising:
   a. a substantially rigid wheel having:
      1. an axle hub,
      2. a web extending radially outwardly from said hub,
      3. a circumferential transverse flange extending about the periphery of said web providing a tire seat surface, and
      4. a locking rim extending radially outwardly from said flange, said rim having circumferentially spaced slots extending therethrough, and,
   b. a resilient tire molded on said locking rim and extending outwardly from and seating against said transverse flange, said tire material being continuous through said elongate slots for locking said tire on said wheel.

2. The wheel assembly in claim 1 having a tire insert on said locking rim, said tire being molded about said tire insert.

3. The wheel assembly in claim 2 wherein said tire insert is hollow cored.

4. The wheel assembly in claim 2 wherein said tire insert is solid cored.

5. A wheel assembly comprising:
   a. a substantially rigid wheel having:
      1. an axle hub,
      2. a web extending radially outwardly from said hub,
      3. a circumferential transverse flange extending about the periphery of said web providing a tire seat surface, and
      4. a locking rim extending radially outwardly from said flange, said rim having circumferentially spaced slots extending therethrough, said rim also having a partial tire core integrally attached thereto and extending outwardly from said rim,
   b. a tire core insert on said partial tire core and locking rim thereby forming a tire core, and
   c. a resilient molded tire on said locking rim and extending outwardly from and seating against said transverse flange, said tire material being continuous through said elongate slots for locking said tire on said wheel.

* * * * *